United States Patent
Ghannam et al.

(10) Patent No.: US 9,683,916 B2
(45) Date of Patent: Jun. 20, 2017

(54) ROUGH ROAD SIMULATION

(71) Applicant: Ford Global Technologies, LLC, Dearborn, MI (US)

(72) Inventors: Mahmoud Yousef Ghannam, Canton, MI (US); Stephen Philip Panoff, Canton, MI (US); Michael Barnhart, Saline, MI (US); Michael Foster, Southfield, MI (US); Roy Joseph Scott, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 243 days.

(21) Appl. No.: 14/737,612

(22) Filed: Jun. 12, 2015

(65) Prior Publication Data
US 2016/0363509 A1    Dec. 15, 2016

(51) Int. Cl.
G01M 7/00    (2006.01)
G01M 17/007    (2006.01)

(52) U.S. Cl.
CPC .............................. G01M 17/0078 (2013.01)

(58) Field of Classification Search
None
See application file for complete search history.

(56) References Cited

U.S. PATENT DOCUMENTS

| | | | |
|---|---|---|---|
| 5,165,270 A * | 11/1992 | Sansalone | G01N 3/30 73/12.08 |
| 5,880,381 A | 3/1999 | Sathe | |
| 6,529,838 B1 | 3/2003 | Horiuchi | |
| 7,103,460 B1 | 9/2006 | Breed | |
| 7,516,646 B2 * | 4/2009 | Makimoto | G01M 7/08 73/12.12 |
| 8,322,204 B2 * | 12/2012 | Maeda | G01M 1/36 73/116.04 |
| 8,776,575 B2 | 7/2014 | Young | |
| 8,801,528 B1 * | 8/2014 | Dras | A63B 69/0079 473/147 |
| 2014/0373598 A1 | 12/2014 | Hondroulis | |

FOREIGN PATENT DOCUMENTS

DE    10340222 A1    4/2005

* cited by examiner

*Primary Examiner* — Peter Macchiarolo
*Assistant Examiner* — Jermaine Jenkins
(74) *Attorney, Agent, or Firm* — Frank A. MacKenzie; Bejin Bieneman PLC

(57) ABSTRACT

A system includes a platform for receiving a test device programmed to output a data signal. A shaft is spaced from the platform. A plurality of impact objects are disposed on the shaft and are configured to strike the platform. A motor is coupled to the shaft and configured to rotate the shaft. A processor is programmed to identify an anomaly in the data signal as a result of the plurality of impact objects striking the platform.

20 Claims, 4 Drawing Sheets

ROUGH ROAD SIMULATION

BACKGROUND

Vehicles operate on many different types of roads. Paved roads are generally smooth while unpaved roads, such as gravel roads or dirt roads, are generally bumpy. Vehicle suspension systems are often tuned to accommodate different road surfaces. Nevertheless, drivers typically can tell when the vehicle is operating on a smooth surface as opposed to a bumpy surface.

DETAILED DESCRIPTION

The roughness of certain road surfaces can cause some sensor anomalies. For example, sensors that measure yaw rate, pitch rate, roll angle, etc., may output anomalous signals while the vehicle is driven on a rough road surface. The vehicle can compensate for such anomalous signals if different road roughness surfaces can be simulated and tested.

An example system for testing how different road surfaces may affect the sensors of, e.g., the restraint control module may includes a platform for receiving a test device programmed to output a data signal. A shaft is spaced from the platform. A plurality of impact objects are disposed on the shaft and are configured to strike the platform. A motor is coupled to the shaft and configured to rotate the shaft. A processor is programmed to identify an anomaly in the data signal as a result of the plurality of impact objects striking the platform. The same or a similar device can also or alternatively be used to test how certain road surfaces will affect, e.g., paint chipping, noise, denting/deformation in vehicle bodies, or the like.

The elements shown may take many different forms and include multiple and/or alternate components and facilities. The example components illustrated are not intended to be limiting. Indeed, additional or alternative components and/or implementations may be used.

Figure 1:
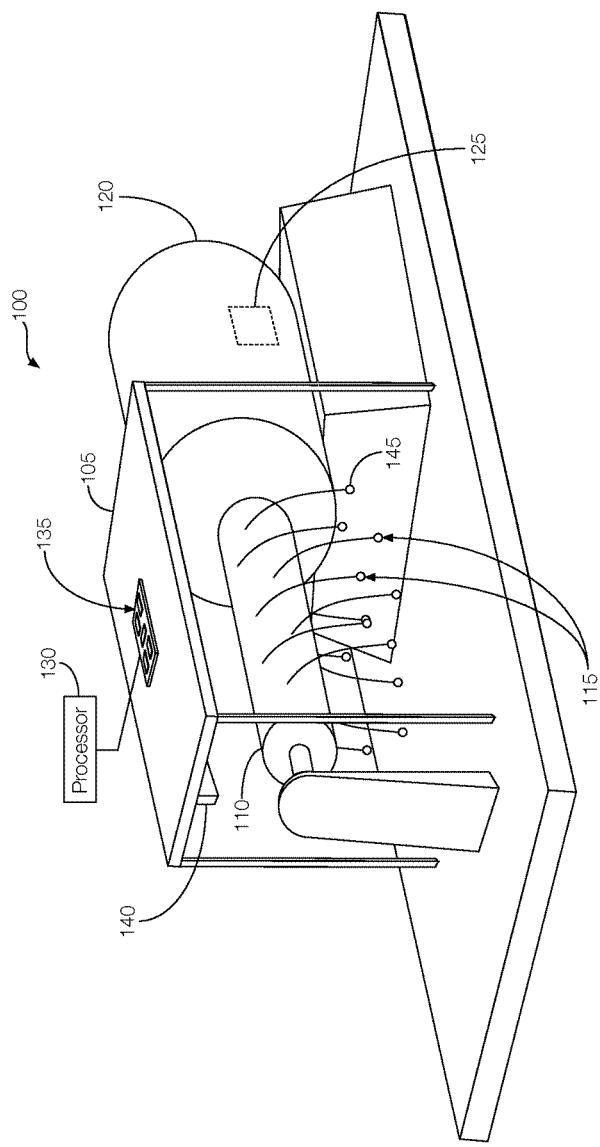
FIG. 1 illustrates an example system for simulating a rough road surface.

As illustrated in FIG. 1, the system 100 includes a platform 105, a shaft 110, multiple impact objects 115, a motor 120, a motor controller 125, and a processor 130.

The platform 105 may include a plate, a vehicle component, or another structure that has an area for receiving a test device 135. The receiving area may include a way to fasten the test device 135 to the platform 105. For instance, the receiving area may include threaded holes for receiving screws or bolts that can be used to fasten the test device 135 to the platform 105. The platform 105 may be moveable relative to other components of the system 100. For example, the platform 105 may be mounted on a track that allows the platform 105 to slide and tilt forward, backward, left, or right relative to, e.g., the shaft 110. Further, the platform 105 may be mounted to a lift that permits the platform 105 to move up or down relative to, e.g., the shaft 110. In some possible approaches, the platform 105 may include a fin 140 (see FIGS. 2-3) or other protrusion. The test device 135 may include one or more electronic components that can detect an impact and output signals associated with the impact. For instance, the test device 135 may include a restraint control module, brake control module, a body control module, etc., and one or more sensors. The sensors may detect when the impact objects 115 strike the platform 105. The sensors, the restraint control module, or both, may output data signals in accordance with the impacts detected. Alternatively or in addition, the test device 135 may include a vehicle component so that, e.g., paint chipping, denting/deformation, and sound dampening may be tested via the system 100.

The shaft 110 may include a cylindrical object spaced from the platform 105. As shown in FIG. 1, the shaft 110 is located under the platform 105. The shaft 110, however, may alternatively be located above or next to the platform 105. The shaft 110 may be formed from a relatively rigid material such as, e.g., a metal. Moreover, the shaft 110 may include, e.g., openings or other features to receive the impact objects 115. For instance, as discussed in greater detail below, the openings may allow the impact objects 115 to be tethered to the shaft 110.

The impact objects 115 may be disposed on the shaft 110, and the rotation of the shaft 110 may cause at least one of the impact objects 115 to periodically strike part of the platform 105, such as the fin 140 or other protrusion. Each impact object 115 may include a pellet 145 tethered to the shaft 110. The pellet 145 may be formed from a relatively hard material, such as a metal or stone. The pellet 145 may have any shape, and each pellet 145 need not have the same shape as the other pellets 145. One or more pellets 145 may be spherical. Alternatively or in addition, one or more pellets 145 may have a different shape, such as a hexagonal shape (e.g., a hex nut). In some possible approaches, one or more pellets 145 may have an irregular shape like a rock. Further, the pellets 145 may be smooth or rough. The pellets 145 may each have the same or different sizes and weights. A wire, string, cord, rope, etc., may be used to tether each pellet 145 to the shaft 110.

The motor 120 may include any device that converts electrical energy into rotational motion. The motor 120 may be coupled to the shaft 110, and the rotational motion of the motor 120 may provide a torque to the shaft 110 that causes the shaft 110 to rotate. The operation of the motor 120 may be controlled by the motor controller 125, as discussed in greater detail below.

The motor controller 125 may include any electronic device programmed to output control signals that control the operation of the motor 120. The motor controller 125 may receive a desired rotational speed as an input. The input may be a user input provided via, e.g., a user interface device or may be based on a predetermined value or set of values. The motor controller 125 may be programmed to output control signals in accordance with the desired rotational speed. Thus, the control signals, when provided to the motor 120, may that cause the motor 120 to rotate the shaft 110 at a particular speed or sequence of speeds. Further, the signals output by the motor controller 125 may identify a direction of rotation. Thus, the motor 120 may spin the shaft 110 in a clockwise direction or a counterclockwise direction depending on the control signals output by the motor controller 125.

The processor 130 may include any electronic device, such as a computer chip, that is programmed to identify anomalies in the data signals output by the test device 135. The anomalies may be caused by, e.g., one or more impact objects 115 striking the platform 105. For instance, the processor 130 may be programmed to receive the data signals output by one or more sensors incorporated into the test device 135. The processor 130 may be programmed to process the data signals and determine whether any of the impacts are affecting the output of any of the sensors. The processor 130 may output signals to, e.g., a display device so that the effect of the impact objects 115 on the sensors can be evaluated.

To process the data signal, the processor 130 may be programmed to apply various techniques. One example technique may include a window function such as a Fast Fourier Transform Hanning Window function. Other processing techniques may include implementing specified filters, comparing the data signal output by the sensor to a given vehicle profile in the frequency domain, analyzing acceleration and rotational speeds relative to frequency, and identifying any fault messages generated during the test.

Figure 2:
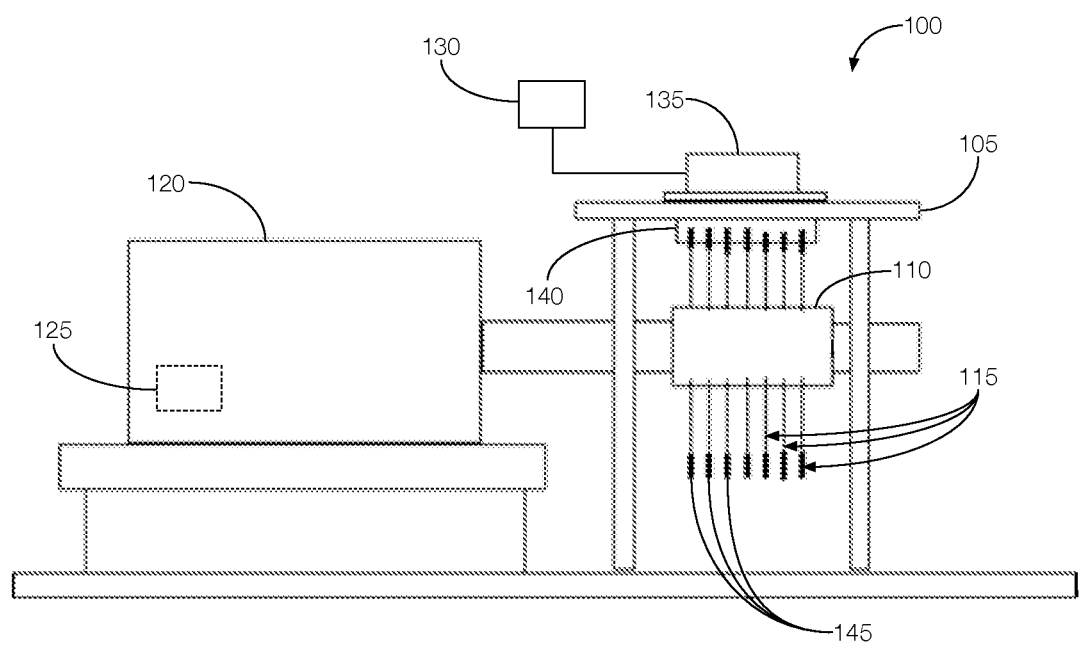
FIG. 2 is a side view of the example system for simulating a rough road surface.
Figure 3:
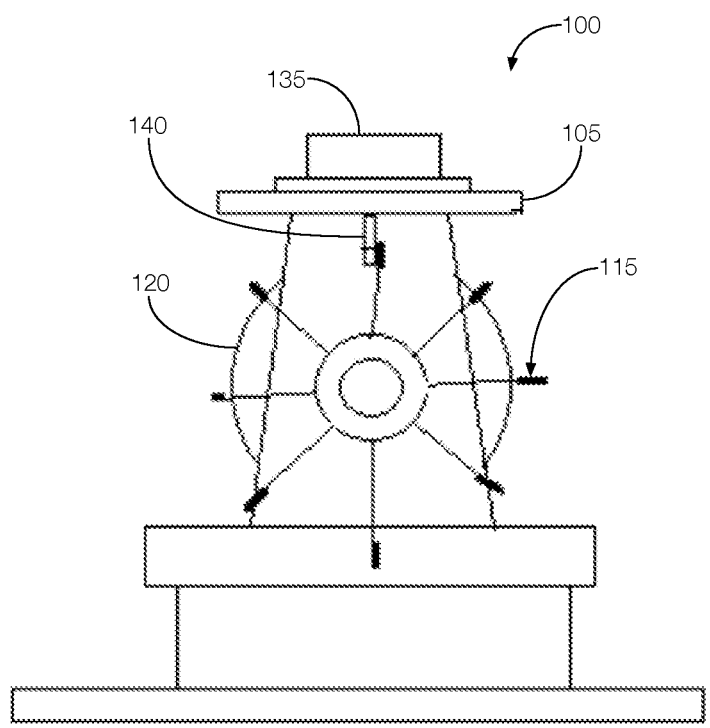
FIG. 3 is a front view of the example system for simulating a rough road surface.

FIGS. 2 and 3 are a side and front views, respectively, of the example system 100 for simulating a rough road surface. Although shown in a relatively flat, horizontal orientation in FIGS. 2 and 3, the orientation of the platform 105 with the test device 135 may be adjusted so that the effect of the impact objects 115 can be evaluated from different angles and locations. After the orientation of the platform 105 is set, the test device 135 may be powered on so that it may begin to record measurements. Once powered on, the motor 120 may be turned on so that the shaft 110 will rotate. The platform 105 may be lowered toward the shaft 110 until the impact objects 115 begin to periodically hit the platform 105. The shock from the impacts may be transferred to the platform 105. The sensors on the platform 105 may detect the impacts and output data signals. The data signals may include the same type of data signals that the sensors would output if the data signals were, e.g., installed in a vehicle. For instance, the sensors, if used with a restraint, brake, body, or other type of control module, may output signals associated with the yaw rate, pitch rate, roll angle, acceleration, etc., of the vehicle. The sensor measurements, and thus the data signals generated by the sensors, may be affected by the impacts of the impact objects 115. The processor 130 may receive and process the data signals to determine how the simulated rough road surface has affected the data signals. For instance, the processor 130 may identify certain anomalies in the data signal that could adversely affect how the restraint control device operates. The test device 135 may then be calibrated to compensate for such anomalies. One way to compensate for such anomalies may include comparing the data signals to an acceptable range and determining whether the data signals are within the acceptable range. If so, the processor 130 may determine that no further tuning of the test device 135 is necessary. If the data signal falls outside of the acceptable range, however, the processor 130 may indicate that further tuning is necessary to filter out or otherwise compensate for the anomalous readings.

Different tests may be performed on the test device 135 to simulate different circumstances. For instance, adjusting the rotational speed of the shaft 110 may simulate different road speeds. Adjusting the distribution and size of the tethered pellets 145 may simulate different gravel sizes on a gravel road. Changing the orientation of the platform 105 relative to the shaft 110 may simulate different impact directions of gravel. Moreover, properties of the platform 105 itself can be adjusted to determine whether such adjustments reduce the number of anomalous readings. For instance, the type and thickness of the material of the platform 105 may correspond to a vehicle floorpan material type and thickness, respectively. Thus, changing the material used for the platform 105 may help test how different floorpan material types and thicknesses affect the data signal on various rough road surfaces.

Figure 4:
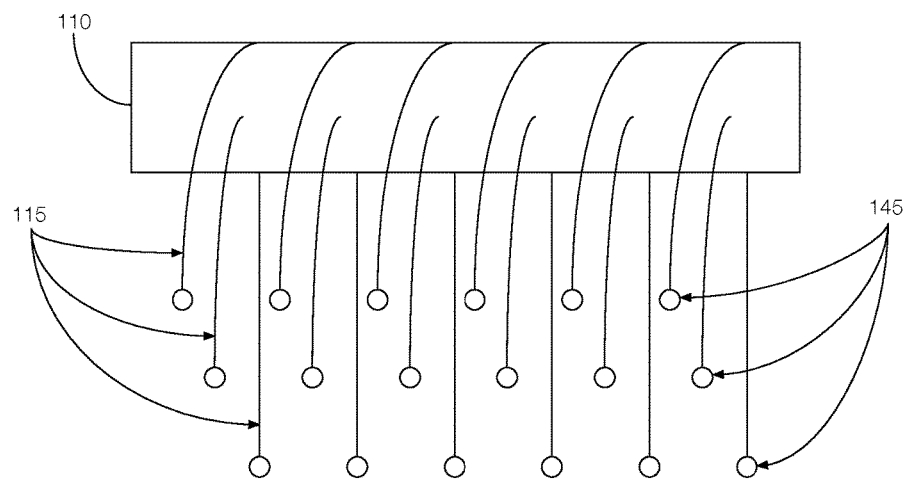
FIG. 4 is a side view of an example shaft with a plurality of impact objects arranged to simulate a rough road surface.

FIG. 4 is an example side view of the shaft 110 with multiple impact objects 115 arranged to simulate a rough road surface as the shaft 110 spins. The impact objects 115, as shown, are arranged in offset rows. The impact objects 115 could alternatively be disposed on the shaft 110 in other arrangements. For instance, the impact objects 115 may be distributed at evenly spaced intervals both along and about the shaft 110. Alternatively, the impact objects 115 may be distributed at erratic intervals so that the distance between one pair of impact objects 115 is different from the distance between another pair of impact objects 115.

Figure 5:
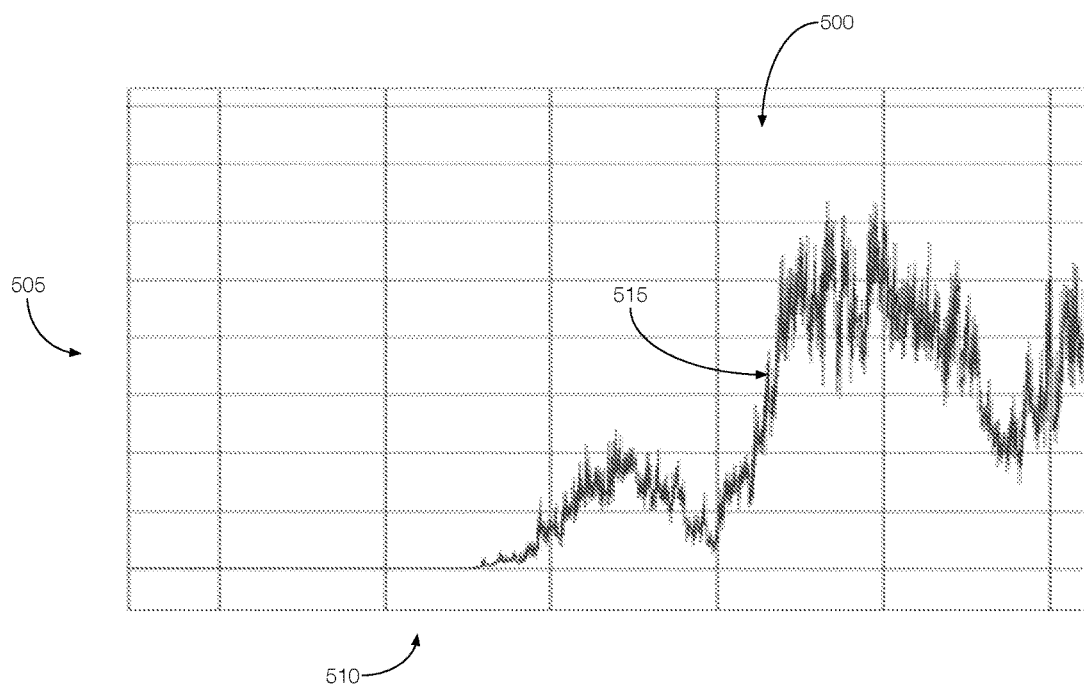
FIG. 5 is a graph of an example output of a test device used with the system for simulating a rough road surface.

FIG. 5 is a graph 500 of an example output of a test device 135 used with the system 100 for simulating a rough road surface. The graph 500 may be presented on a display device that receives signals from the processor 130. The Y-axis 505 may represent the magnitude of the output of one of the sensors as processed by the processor 130. The X-axis 510 may represent time in seconds. The line 515 may represent the sensor output. As shown in the graph 500, the line 515 is relatively flat for several seconds until the motor 120 is turned on to simulate using the sensor on a rough road surface. Thus, the sensor does not pick up any movement until that time. Once the motor 120 is turned on, and the impact objects 115 begin to strike the platform 105, the sensor begins to detect the impacts and output the data signal represented by the line 515. The processor 130 processes the data signal and outputs the data signal to the display device so that the effect the impacts has on the sensor can be evaluated. From the data signal, the sensors, the restraint control module, or other potential test devices 135 can be designed to compensate for when the vehicle is operating on a rough road surface.

Figure 6:
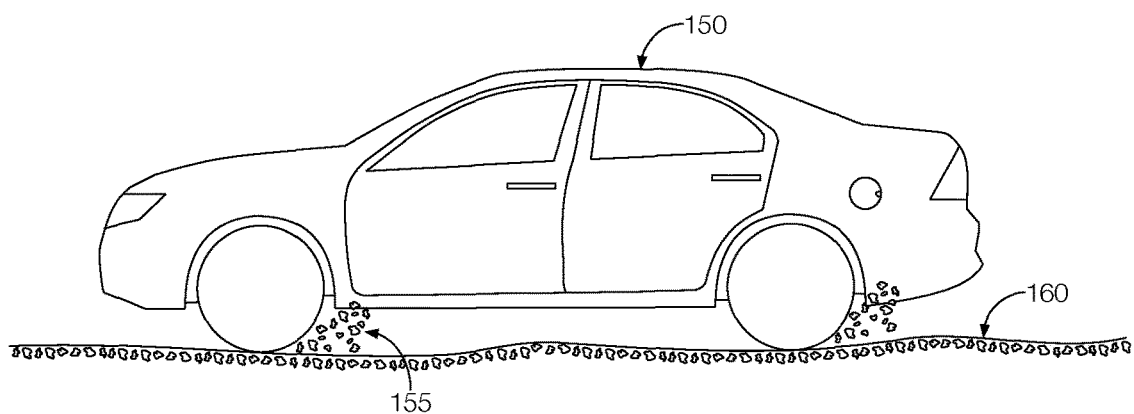
FIG. 6 is an environmental view of a vehicle traveling on a rough road surface.

Referring now to FIG. 6, the same or a similar device 100 can also or alternatively be used to test how certain road surfaces will affect, e.g., paint chipping, noise, denting/deformation in vehicle bodies, or the like. FIG. 6 illustrates an environment where a vehicle 150 is hit with gravel or rocks 155 as it travels on a rough road surface 160. The tires of the vehicle 150 kick up the gravel 155 from the road surface 160 and toward the vehicle body. The gravel 155 may chip the paint, dent the vehicle body, or both. Further, the sound of the gravel 155 hitting the vehicle 150 may be displeasing to the driver. Thus, the system 100 may be used to test a vehicle body to determine, e.g., how gravel 155 may chip paint, dent the vehicle body, or cause unpleasing sounds to the vehicle occupants.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising:
   a platform for receiving a test device programmed to output a data signal;
   a shaft spaced from the platform;
   a plurality of impact objects disposed on the shaft and configured to strike the platform;
   a motor coupled to the shaft and configured to rotate the shaft; and
   a processor programmed to identify an anomaly in the data signal as a result of the plurality of impact objects striking the platform.

2. The system of claim 1, wherein the impact objects each include a pellet tethered to the shaft.

3. The system of claim 2, wherein each of the impact objects includes a wire attached to the pellet for tethering the pellet to the shaft.

4. The system of claim 2, wherein at least one of the pellets weighs more than another of the pellets.

5. The system of claim 2, wherein each of the pellets has a generally spherical shape.

6. The system of claim 1, wherein the platform includes a fin, and wherein the plurality of impact objects strike the fin as the shaft rotates.

7. The system of claim 1, further comprising a motor controller programmed to output control signals to control the motor.

8. The system of claim 7, wherein the control signals represent a rotational speed.

9. The system of claim 1, wherein the test device includes a restraint control module and at least one sensor programmed to detect an impact when at least one of the plurality of impact objects strikes the platform and output the data signal in accordance with the impact detected.

10. The system of claim 9, wherein the processor is programmed to receive and process the data signal output by the at least one sensor.

11. A system comprising:
a platform for receiving a test device programmed to output a data signal;
a shaft spaced from the platform;
a plurality of impact objects disposed on the shaft and configured to strike the platform, wherein each impact object includes a pellet tethered to the shaft;
a motor coupled to the shaft and configured to rotate the shaft;
a motor controller programmed to output control signals that control a rotational speed of the motor; and
a processor programmed to identify an anomaly in the data signal as a result of the plurality of impact objects striking the platform.

12. The system of claim 11, wherein each of the impact objects includes a wire attached to the pellet for tethering the pellet to the shaft.

13. The system of claim 11, wherein at least one of the pellets weighs more than another of the pellets.

14. The system of claim 11, wherein each of the pellets has a generally spherical shape.

15. The system of claim 11, wherein the platform includes a fin, and wherein the plurality of impact objects strike the fin as the shaft rotates.

16. The system of claim 11, wherein the test device includes a restraint control module and at least one sensor programmed to detect an impact when at least one of the plurality of impact objects strikes the platform and output the data signal in accordance with the impact detected.

17. The system of claim 16, wherein the processor is programmed to receive and process the data signal output by the at least one sensor.

18. A system comprising:
a platform for receiving a restraint control module and at least one sensor programmed to output a data signal, the platform having a fin;
a shaft spaced from the platform;
a plurality of impact objects disposed on the shaft and configured to strike the fin, wherein each impact object includes a pellet tethered to the shaft, and wherein rotation of the shaft causes at least one pellet to strike the fin;
a motor coupled to the shaft and configured to rotate the shaft;
a motor controller programmed to output control signals that control a rotational speed of the motor; and
a processor programmed to identify an anomaly in the data signal as a result of at least one of the pellets striking the platform.

19. The system of claim 18, wherein at least one sensor is programmed to detect an impact when at least one of the pellets strikes the platform and output the data signal in accordance with the impact detected.

20. The system of claim 18, wherein the processor is programmed to receive and process the data signal output by the at least one sensor.

* * * * *